US011193249B2

(12) United States Patent
Ostrow et al.

(10) Patent No.: US 11,193,249 B2
(45) Date of Patent: Dec. 7, 2021

(54) ROBOTIC DE-ICER

(71) Applicants: Ari J. Ostrow, New York, NY (US); Adriel Kohananoo, New York, NY (US); Ruben Prawer, New York, NY (US)

(72) Inventors: Ari J. Ostrow, New York, NY (US); Adriel Kohananoo, New York, NY (US); Ruben Prawer, New York, NY (US)

( * ) Notice: Subject to any disclaimer, the term of this patent is extended or adjusted under 35 U.S.C. 154(b) by 276 days.

(21) Appl. No.: 16/423,327

(22) Filed: May 28, 2019

(65) Prior Publication Data

US 2020/0378080 A1    Dec. 3, 2020

(51) Int. Cl.
| | |
|---|---|
| *B25J 9/16* | (2006.01) |
| *E01H 10/00* | (2006.01) |
| *B25J 13/08* | (2006.01) |
| *G05D 1/02* | (2020.01) |
| *B25J 5/00* | (2006.01) |

(52) U.S. Cl.
CPC ............ *E01H 10/007* (2013.01); *B25J 9/162* (2013.01); *B25J 9/1602* (2013.01); *B25J 9/1676* (2013.01); *B25J 13/086* (2013.01); *B25J 5/007* (2013.01); *G05D 1/0214* (2013.01); *G05D 1/0236* (2013.01); *G05D 2201/02* (2013.01)

(58) Field of Classification Search
CPC ......... E01H 10/007; E01H 8/125; E01H 8/08; E01H 11/00; E01H 8/02; E01H 5/00; E01H 8/00; E01H 6/00; E01H 5/108; E01H 5/106; E01H 5/104; E01H 5/102; E01H 5/10; E01B 27/026; B25J 13/086; B25J 9/1602; B25J 9/162; B25J 9/1676; B25J 5/007; B25J 9/1684; B25J 9/1666; B25J 9/1664; B25J 13/088; G05D 1/0214; G05D 2201/02; G05D 1/0236; G05D 2201/0203; G05D 1/0238; G05D 1/0278; G05D 1/0274; G05D 1/0212; G05D 1/0227; G05D 1/024; G05D 1/0246; G05D 1/0248
USPC ................ 701/32.2, 32.3, 300, 301; 700/255
See application file for complete search history.

(56) References Cited

U.S. PATENT DOCUMENTS

| | | | |
|---|---|---|---|
| 9,782,893 B2 * | 10/2017 | Yamazaki | ............... B25J 9/0087 |
| 2004/0124260 A1 * | 7/2004 | Ward | .................... E01H 10/007 |
| | | | 239/146 |
| 2009/0282707 A1 * | 11/2009 | Shenouda | ............... E01H 5/106 |
| | | | 37/227 |
| 2010/0071734 A1 * | 3/2010 | Kim | ..................... F22B 37/005 |
| | | | 134/167 R |
| 2014/0121881 A1 * | 5/2014 | Diazdelcastillo | .... G05D 1/0265 |
| | | | 701/23 |
| 2014/0217194 A1 * | 8/2014 | Han | ....................... B60S 1/488 |
| | | | 239/1 |

(Continued)

*Primary Examiner* — B M M Hannan
(74) *Attorney, Agent, or Firm* — Meister Seelig & Fein LLP; Seth H. Ostrow, Esq.

(57) ABSTRACT

An apparatus for de-icing a pathway, the apparatus comprising a frame including a set of wheels, a salt dispenser, a servo attached to the salt dispenser, one or more motors, the motors attached to at least one of the set of wheels, and a microcontroller communicatively coupled to the servo and the one or more motors, wherein the microcontroller instructs the servo to operate the salt dispenser and activates the one or more motors to drive the at least one of the set of wheels.

11 Claims, 4 Drawing Sheets

(56) References Cited

U.S. PATENT DOCUMENTS

| | | | |
|---|---|---|---|
| 2015/0330045 A1* | 11/2015 | Kime | B05B 3/1007 |
| | | | 239/7 |
| 2016/0298970 A1* | 10/2016 | Lindhe | G01C 21/206 |
| 2016/0309973 A1* | 10/2016 | Sheikh | A47L 11/4072 |
| 2016/0312423 A1* | 10/2016 | Kohn | E01C 19/203 |
| 2018/0143634 A1* | 5/2018 | Ott | G05D 1/0214 |
| 2018/0307241 A1* | 10/2018 | Holz | B66F 9/0755 |
| 2018/0361583 A1* | 12/2018 | Williams | G05D 1/0274 |
| 2019/0003137 A1* | 1/2019 | Gao | G01S 15/93 |
| 2020/0062252 A1* | 2/2020 | Parks | G06F 16/29 |

* cited by examiner

```
#include <Servo.h>
int LMotor = 10;
int RMotor = 9;
int servoPin = 11;
float x = 0;
float z = .5;
int t1 = millis();
int t0 = millis();
Servo Servo1;
void setup(){
 pinMode(9, OUTPUT);
 pinMode(10, OUTPUT);
 Servo1.attach(servoPin);
 Serial.begin(9600);
 delay(3000);
}
void loop(){
 t1 = millis() – t0;
 Servo1.write(x);
 x = x + z;
 if (x >= 150 || x <= -20){
   z = z * -1;
 }
 if (t1 <= 2000){
 digitalWrite(RMotor, HIGH);
 }
 if (t1 >= 130 && t1 <= 2000){
 digitalWrite(LMotor, HIGH);
 }
 If (t1 >= 2000 && t1 <= 2200){
 digitalWrite(RMotor, LOW);
 digitalWrite(LMotor, LOW);
 }
 if (t1 >= 2200){
 t1 = millis();
 t0 = millis();
 }
 Serial.println(x);
 t1 = millis() = t0;
}
```

Fig. 2

ROBOTIC DE-ICER

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to a robotic de-icer capable of automatically dispensing salt on an icy surface.

DESCRIPTION OF THE RELATED ART

Injuries and deaths caused by slipping on ice on sidewalks and driveways is a growing concern during the wintertime. In fact, 42,480 work injuries involved ice, sleet, or snow in 2014, and accidental falls are the second most common cause of death from unintentional injuries after vehicle collisions (Bureau of Labor Statistics). Following a snowstorm, a homeowner must clear their driveway of snow, and then, they must melt the ice covering their driveway through a salting process. Homeowners must clear their driveway of snow, and then, they must melt the ice covering their driveway through a salting process after snowfall or rainfall followed by below-freezing temperatures that freezes the rain into ice.

Salting a driveway and/or pathway is a bothersome and dangerous undertaking that millions of Americans must undertake every year, often multiple times in a year. Current methods of salting a driveway are inefficient and even dangerous. Salting a driveway often includes serious injuries or even death, and even if the homeowner elects to commission this task to workers, the driveway is ultimately handled manually.

There are existing products that can be used for salting driveways, such as hopper spreaders. A hopper spreader is a mechanized salt spreader unit that can be connected to a back of a vehicle so that a user can salt the ice while driving. However, salting a driveway with a hopper spreader may be cumbersome or impossible if the driveway is not big enough to drive around. Another shortcoming of the hopper spreader is that it requires the user to get in their vehicle and drive around pouring salt.

There is thus a need for a device for salting driveways and other spaces without manual intervention or maneuvering of a vehicle around.

SUMMARY OF THE INVENTION

The present invention provides an apparatus for de-icing a pathway. According to one embodiment, the apparatus comprises a frame including a set of wheels, a salt dispenser, a servo attached to the salt dispenser, one or more motors, the motors attached to at least one of the set of wheels, and a microcontroller communicatively coupled to the servo and the one or more motors, wherein the microcontroller instructs the servo to operate the salt dispenser and activates the one or more motors to drive the at least one of the set of wheels.

The microcontroller may instruct the servo to dispense salt from the salt dispenser at variable intervals or times. The microcontroller may also instruct the servo to release salt from the salt dispenser at one or more angles or rotations. Dimensional inputs of the pathway may be received by the microcontroller and may be used to program the servo and the one or more motors based on the dimensional inputs. In another embodiment, the apparatus may further comprise one or more sensors that detect dimensions of the pathway. Alternatively, the microcontroller may receive dimensional inputs of the pathway from a global positioning system.

The microcontroller may be programmed to operate the servo and the one or more motors at a given start time. The microcontroller may receive instructions from an application controlled via a mobile device. The application may determine a given start time to operate the servo and the one or more motors based on weather information.

According to one embodiment, a robot system comprises at least one sensor configured to provide locating information and at least two motors. A first of the at least two motors is configured for an operational function and a second of the at least two motors is configured for movement. The system also includes a processor communicatively coupled to the at least two motors and the at least one sensor and a memory having executable instructions stored thereon. When executed by the processor the executable instructions cause the processor to receive the locating information from the at least one sensor, determine a position of the robot system in an area based on the locating information, generate function path information based on the position, and control the at least two motors based on the function path information and the position.

The processor is further operable to determine the position based on an actual position on a stored map. The stored map may include at least one function task associated with at least one area segment. The processor may further generate an updated map based on a detection of an obstacle. The locating information may include at least one of laser data, sonar data, odometry data, gyroscope data, and global positioning system data.

In another embodiment, the processor may detect obstacles in a path of the robot system. The processor may alter operation of the at least two motors based on the detection of obstacles and generate a new function path. The at least one sensor may comprise an obstacle detecting device including one or more lasers and a camera device. The processor may also be configured to receive information associated with artificial markers, the information including features associated with the artificial markers and instructions associated with the features and control the at least two motors based on the instructions. The processor may further detect placement of light beams within the area and generate a new function path the prohibits the robot system from passing through the light beams. In another embodiment, the processor may receive instructions from a client device, and control the at least two motors based on the instructions.

In other embodiments, the robot system described herein may be configured to drop other materials onto a path or roadway. As one example, the robot system as described herein may be used to drop seed on a field or lawn for the automated planting of grass or crops.

BRIEF DESCRIPTION OF THE DRAWINGS

The invention is illustrated in the figures of the accompanying drawings which are meant to be exemplary and not limiting, in which like references are intended to refer to like or corresponding parts.

FIG. 2 illustrates exemplary code for a robotic de-icer according to one embodiment of the present invention.

DETAILED DESCRIPTION OF THE INVENTION

Figure 1:
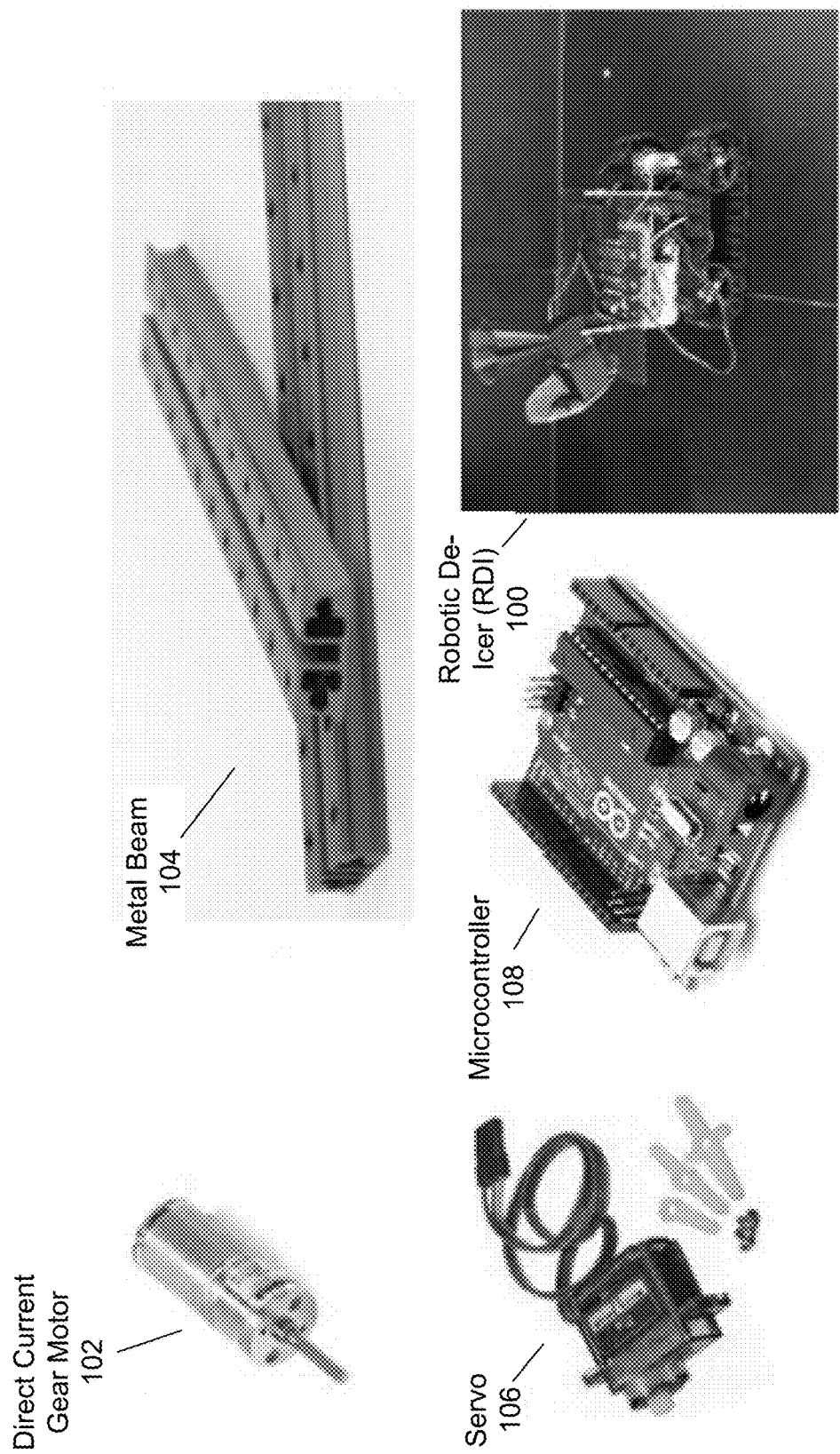
FIG. 1 illustrates exemplary components of a robotic de-icer according to one embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses robot systems that may be programmed to automatically perform tasks. According to one embodiment, a robot system comprises a robotic de-icer ("RDI") that can be programmed for automatically salting and de-icing surfaces, such as driveways, roads and other defined areas. The RDI may comprise driving motors, a servo, four wheels, and a microcontroller device (or processor) that allow it to travel over a designated area or pathway. The RDI may comprise two or more driving motors and four wheels incorporated into a, for example, 9.5" by 6.5" metal frame. The driving motors may be connected to the microcontroller, such as an Arduino microcontroller, via wires and resistors. The robot system may further comprise an obstacle detecting device in the form of a sensor comprising one or more lasers, which may be horizontal or vertical line lasers, and a camera device.

The microcontroller may be configured to control the driving motors and the servo simultaneously. For example, the microcontroller of the RDI may execute code that causes the driving motors and a servo to rotate as needed to allow the RDI to move and the salt to be dispensed. The driving motors may be connected to wheels on opposing sides and cause the wheels to spin. A salt dispenser may be linked with the servo that continuously rotates to allow the release of salt from its designated compartment. The microcontroller may be programmed with code and adjusted to accommodate specific dimensions of a surface requiring salting.

The disclosed robot systems may comprise stand-alone systems, for example, that is mobile, that perform both physical activities and computational activities. The physical activities may be performed using a wide variety of movable parts. The computational activities may be performed utilizing a suitable processor and memory stores, e.g., a data memory storage device. The computational activities may include processing information input from various sensors or other inputs of a robot system to perform functions.

FIG. 1 present exemplary components of a robotic de-icer according to one embodiment of the present invention. Direct current gear motor 102 may be used to facilitate movement of RDI 100. RDI 100 may also include metal beams 104 to support a chassis. Servo 106, e.g., a SG90 Micro Servo Motor, may be used as part of the salt dispensing mechanism on RDI 100 that dispenses salt at variable intervals or times, while restricting the salt from falling at other times. Microcontroller 108 may be programmed to control the hardware aspects of the RDI 100 including motor 102, and servo 106.

FIG. 2 presents exemplary code for a robotic de-icer according to one embodiment of the present invention. The exemplary code may cause the RDI to drive down a path and pour salt by operating the driving motors and the servo simultaneously. The illustrated code may begin a loop by operating a servo to release salt at various angles or rotations. Then the code can proceed to command the driving motors of the RDI to drive forward for a predetermined amount of time, pause, and then restart the loop.

Based on the dimensions of a pathway, the motors and servo can be programmed for a specific amount of time (which may be inputted into the code), allowing the RDI to travel along a designated area or pathway, while periodically dispensing salt. The microcontroller may receive dimensional inputs for the RDI to move along the designated area and begin dispensing salt. For example, the dimensional inputs may be used to map the pathway for the RDI to navigate and traverse. According to one embodiment, to allow the RDI to turn, the microcontroller may stop one of two motors that are connected laterally on opposite sides of the RDI (so that only one motor is activated). This technique may allow the RDI to turn in either direction where the direction is based on which motor is deactivated.

Figure 3:
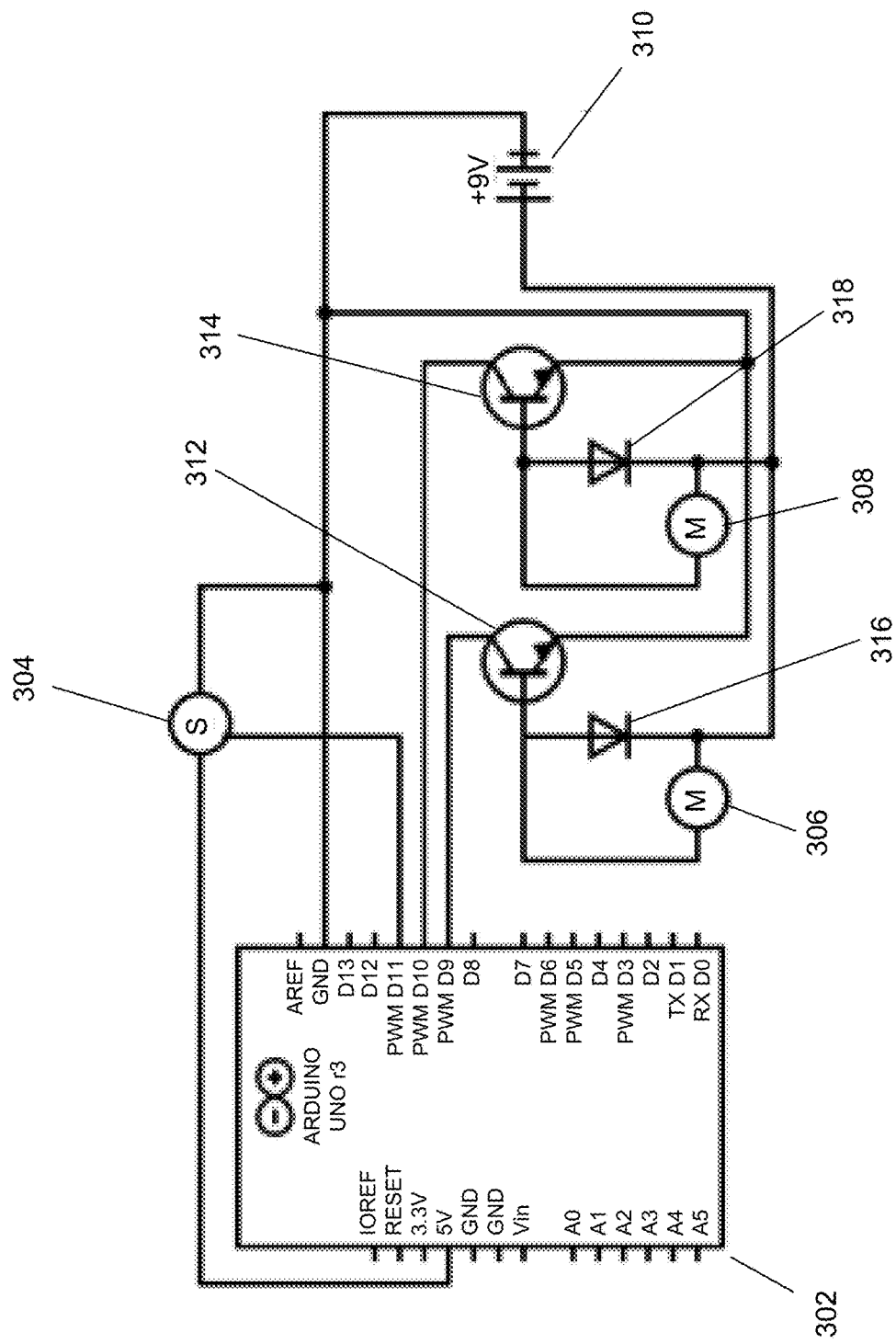
FIG. 3 illustrates a schematic diagram of a robotic de-icer according to an embodiment of the present invention.

FIG. 3 presents a schematic diagram of a robotic de-icer according to an embodiment of the present invention. Microcontroller 302 may transmit signals to components of the RDI. The microcontroller 302 can control motors 306 and 308 that are connected to wheels. Servo 304 is connected to the 5V pin, digital pin 11, and ground pin of the microcontroller 302. Battery 310 connects to the ground pin of microcontroller 302 and to the positive sides of both motors 306 and 308. Transistors 312 and 314 use diodes 316 and 318, respectively, to connect to the ground side of the motors 306 and 308. The motor 306 is linked to pin D9 and motor 308 is linked to pin D10 on the microcontroller 302. The transistors further connected to the ground pin of microcontroller 302.

The RDI may be used on an icy driveway that requires salting. A user may input dimensions of the driveway or pathway that they want salted into an RDI interface and fill the salt compartment with salt. Alternatively, RDI may include sensors to detect the dimensions of a pathway and/or receive GPS (Global Positioning System) information and coordinates for mapping areas of operation. The RDI may be operated or instructed by an integrated application that can be controlled via a mobile device. The application may allow the user to set a start time for the RDI to begin.

The application may allow for programming the RDI to operate according to dimensional parameters for one or more designated areas or pathways and set on a timer or scheduler, where users may have more than one driveway or area that they want de-iced. After selecting a start time and the designated area, the application may also determine an estimation of when the job will be completed by, to allow for better planning. The estimate may be based on, for example, a total distance the RDI is programmed to traverse. In another embodiment, the integrated application may be configured to operate in conjunction with a weather application or weather data source that allows the integrated application to predict when the pathways will be icy, and to recommend to the user via a mobile notification when he or she should set the RDI's timing to. This allows the user to have peace of mind, resting assured that if the pathway will need salting the next day, he or she will be notified in advance and easily set up the RDI to salt the pathway the next day with ease.

According to other embodiments, the disclosed robot systems may be configured for performing tasks of other appliances, such as automatic lawn mowers, leaf blowers, or agricultural machinery for tasks, such as seed dropping, digging, crop picking, irrigation, chemical spraying, etc. In accordance with one embodiment, the robot system may be programmed with a stored map of an area layout, the stored map having at least one function task associated with at least one area segment. The robot system may determine its position in the area and determine a function path from its position for navigation of the area and completion of the at least one function task. An area may include a two-dimensional plot or a three-dimensional space, for example. Accordingly, an area may be mapped utilizing coordinates in the X and Y axis, or using coordinates in the X, Y and Z axis.

Furthermore, the robot system may create updated maps of an area layout when obstacles are detected in the area layout. When detected, the obstacles can be added to an amended map of the area layout. If the robot system subsequently detects that the obstacle was removed, the robot system may create another amended map that removed the obstacle. The robot system or an application interface may create an amended map upon detections of obstacles. Accordingly, the robot system could receive data and input relating to obstacles in the environment as well as locations of beacons relative to those obstacles. In another embodiment, a user may edit a stored map and change the nature of mapped boundaries in an area layout.

Figure 4:
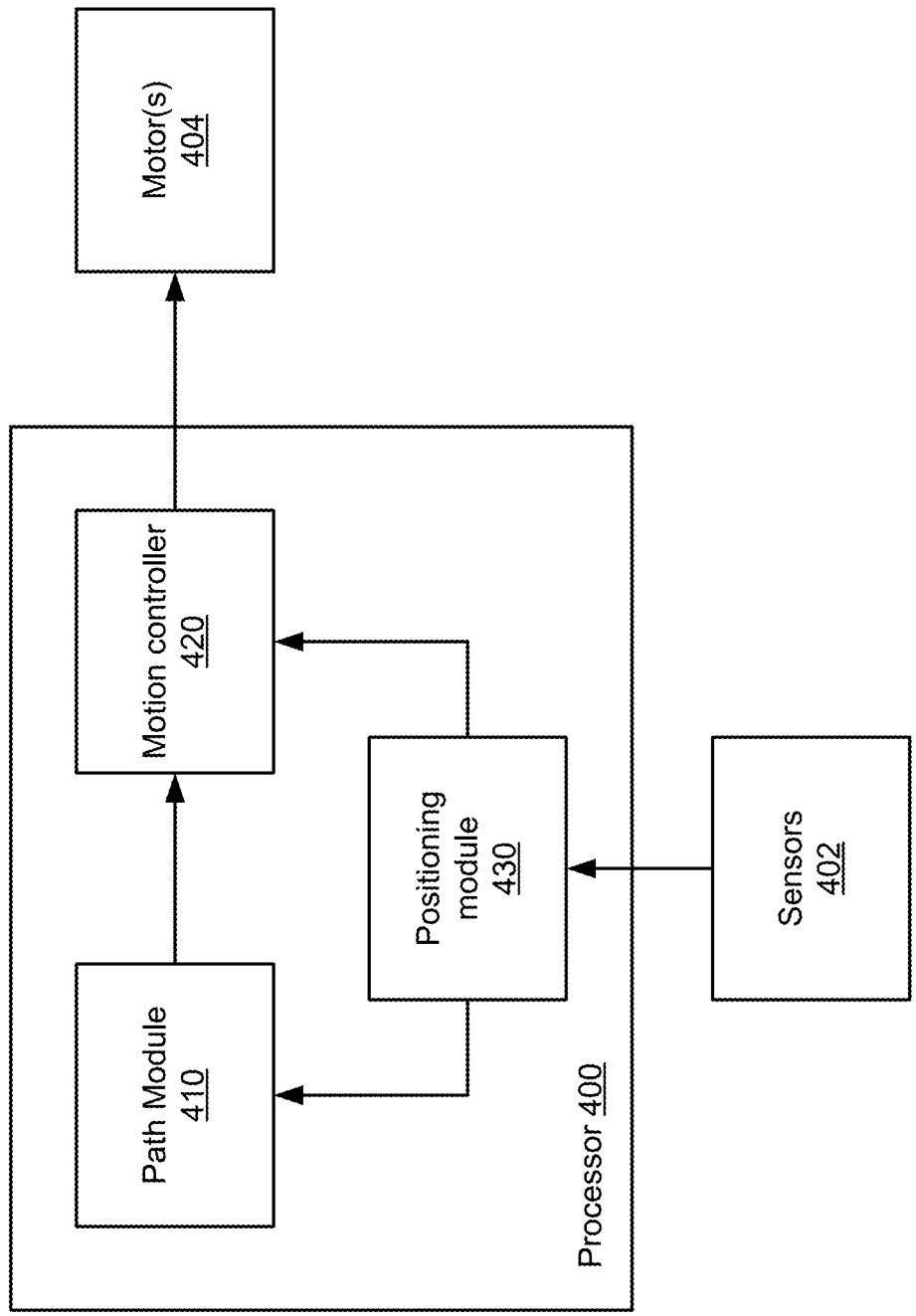
FIG. 4 illustrated a block diagram of a robot system for dropping salt according to an embodiment of the present invention.

FIG. 4 presents a data flow diagram of a computing system according to an embodiment of the present invention. Robot systems disclosed herein may include a processor 400 that includes logic for monitoring and controlling various navigational aspects of the robot system. Processor 400 may also determine the position of the robot system in an area and control navigation of the robot system to different positions in the area and along a function path. Processor 400 may comprise path module 410, motion controller 420, and positioning module 430.

The positioning module 430 may gather a variety of locating information from sensors 402. For example, sensors 402 may provide information, such as laser data, sonar data, odometry data, gyroscope data, GPS data, pre-stored maps data, and x-y position system. In one embodiment, the positioning module 430 may access a stored map of an area layout in which the robot system has been commanded to perform a function. The positioning module 430 may assess the robot system's position in the area and associate that position with an actual position on the stored map.

Path module 410 may determine a function path for the robot system to complete its assigned function and tasks using the current position and the actual position on the stored map. The path module 410 may generate a path of travel for traveling from a current position of the robot system. Any algorithm or logic may be utilized by the path module 410 to generate such a desired path of travel. According to one embodiment, the path module 410 may utilize stored pre-determined function paths for given areas to complete assigned function tasks.

The motion controller 420 may use the path information generated by the path module 410, as well as the position information from the positioning module 430, to control motor(s) 404 of the robot system to move along a given function path. Motor(s) 404 may include motors, for example, at least one for movement and at least one for operational function of the robot system (e.g., salting, spraying, dropping, brushing, cleaning, digging, etc.). Positioning module 430 may also detect obstacles in the planned path of the robot system while the robot system is moving along the path. When an obstacle is detected, the positioning module 430 may communicate with motion controller 420 (e.g., communicate with motor(s) 404 to stop or alter the robot system's movement and operation) and path module 410 (e.g., to generate a new path to avoid the obstacle).

According to another embodiment, navigation and positioning of the robot system may be aided by using artificial markers or landmarks. For example, machine learning may be implemented to train the robot system to navigate certain area layouts. A training phase of the robot system may comprise providing information regarding markers to the robot system. The information may include a feature associated with each marker and instructions associated with each feature. After the training phase, the robot system may autonomously move and operate, recognizing markers and attaining their features. The robot system operation and movement may be controlled according to the instructions assigned to the features. Further description and details of using markers may be found in U.S. Pat. No. 10,209,080, entitled "ROBOTIC CLEANING DEVICE" which is herein incorporated by reference in its entirety.

In yet another embodiment, the robot system may detect the placement of light beams within an area layout. Sensors 402 may include detectors that are operative to detect a force field or a collimated light beam. The robot system may be programmed (e.g., a new function path) to not pass through the collimated beam to prevent the robot system from entering prohibited areas, e.g., access to a descending staircase, roadway, or other boundary. Alternatively, a user may remotely control the robot system, e.g., via a controller, client device, or a smart phone, to manually move or control functional operation of the robot system. The processor 400 may receive remote control instructions and transmit the instructions to positioning module 430 to control the motor(s) 404. In one embodiment, the robot system may receive weather information via communication means and the function task of the robot system may be adapted accordingly, based on the weather information. The weather information can be transferred from an external location (e.g. weather forecast provider) via communication means (e.g. Internet, wireless) to the robot system.

To allow for even more practicality and energy efficiency, another embodiment may include automated charging. The robot system may be complimented with docking station or shed on the side of the pathway when it's not in use. Inside the docking station, a magnetic charger or charger contacts may be configured to accept the robot system. The robot system may be programmed to automatically locate and return to the station when not in use, low on battery operation, or is finished with a task. The charger may receive power to charge the robot system via solar panels attached on the roof of the docking station or through a wall outlet. After the robot system is charged fully, it may automatically stop charging to eliminate the risk of overcharging and damaging the battery or causing other related issues. If, for some reason, the battery reaches low levels, e.g., due to a malfunction in the charger or wiring, a notification may be sent to the user's mobile device via an application to allow for troubleshooting and repairing.

Another feature for the robot system may include automatic salt refilling according to another embodiment. The docking station or shed of the robot system may include a compartment that can be filled with salt and may have a servo motor that allows salt from the compartment to travel into the robot system's salt compartment when docked or charging. A weight sensor under the compartment may be used to determine whether the robot system is filled with salt. When the weight of the robot system reaches are certain value, the shed may cease to flow salt into the robot system's compartment. Similarly, the robot system may further include a weight sensor where if the robot system is in the middle of operation and dips below a certain weight, it may travel back to the docket station to refill and then continue where it left off. The docket station may also include a weight sensor to determine an amount of salt left and may transmit a notification to the owner's mobile device via the application, telling him or her to refill the docking station's salt supply.

FIGS. 1 through 4 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A robotic de-icer comprising:
    at least one sensor configured to provide locating information;
    at least two motors, wherein a first motor of the at least two motors is configured for an operational function including dispensing salt on a pathway and a second motor of the at least two motors is configured for movement including by driving two or more wheels on the robotic de-icer;
    a processor communicatively coupled to the at least two motors and the at least one sensor; and
    a memory having executable instructions stored thereon that when executed by the processor cause the processor to:
    receive the locating information from the at least one sensor,
    determine a position of the robot system in an area based on the locating information, and
    generate function path information based on the position, and
    control the at least two motors based on the function path information and the position including by operating the first motor to dispense salt while simultaneously operating the second motor to drive the two or more wheels to cause movement of the robotic de-icer along the pathway so that salt is dispensed by the robotic de-icer on the pathway while the robotic de-icer is in motion.

2. The robotic de-icer of claim 1, further comprising: the processor being caused by the executable instructions to determine the position based on an actual position on a stored map.

3. The robotic de-icer of claim 2, wherein the stored map includes at least one function task associated with at least one area segment.

4. The robotic de-icer of claim 2, further comprising: the processor being caused by the executable instructions to generate an updated map based on a detection of an obstacle.

5. The robotic de-icer of claim 1, wherein the locating information includes at least one of laser data, sonar data, odometry data, gyroscope data, and global positioning system data.

6. The robotic de-icer of claim 1, further comprising: the processor being caused by the executable instructions to detect obstacles in a path of the robot system.

7. The robotic de-icer of claim 6, further comprising the processor being caused by the executable instructions to:
   alter operation of the at least two motors based on the detection of the detected obstacles; and
   generate a new function path.

8. The robotic de-icer of claim 1, wherein the at least one sensor comprises: an obstacle detecting device including one or more lasers and a camera device.

9. The robotic de-icer of claim 1, further comprising: the processor being caused by the executable instructions to:
   receive information associated with artificial markers, wherein the information includes features associated with the artificial markers and instructions associated with the features; and
   control the at least two motors based on the instructions associated with the features.

10. The robotic de-icer of claim 1, further comprising: the processor being caused by the executable instructions to:
    detect placement of light beams within the area; and
    generate a new function path that prohibits the robot system from passing through the light beams.

11. The robotic de-icer of claim 1, further comprising: the processor being caused by the executable instructions to:
    receive instructions from a client device; and
    control the at least two motors based on the instructions received from the client device.

* * * * *